(12) United States Patent
Lee

(10) Patent No.: US 8,233,104 B2
(45) Date of Patent: Jul. 31, 2012

(54) STEREOSCOPIC TFT-LCD WITH WIRE GRID POLARIZER AFFIXED TO INTERNAL SURFACES SUBSTRATES

(75) Inventor: Sung-Jung Lee, Wuiwang-shi (KR)

(73) Assignee: Pavonine Inc., Incheon (KR)

( * ) Notice: Subject to any disclaimer, the term of this patent is extended or adjusted under 35 U.S.C. 154(b) by 0 days.

(21) Appl. No.: 13/411,442

(22) Filed: Mar. 2, 2012

(65) Prior Publication Data

US 2012/0162552 A1 Jun. 28, 2012

Related U.S. Application Data

(60) Division of application No. 13/073,979, filed on Mar. 28, 2011, now Pat. No. 8,184,216, which is a division of application No. 12/545,915, filed on Aug. 24, 2009, now Pat. No. 7,940,342, which is a continuation of application No. 11/160,737, filed on Jul. 6, 2005, now abandoned.

(30) Foreign Application Priority Data

Jul. 27, 2004 (KR) .......................... 10-2004-0058837
Jun. 14, 2005 (KR) .......................... 10-2005-0050994

(51) Int. Cl.
*G02F 1/1335* (2006.01)
(52) U.S. Cl. ............. 349/15; 349/117; 349/119; 349/96
(58) Field of Classification Search .................. 349/15, 349/96, 117, 119
See application file for complete search history.

(56) References Cited

U.S. PATENT DOCUMENTS

| 5,264,964 | A  | 11/1993 | Faris |
| 5,772,905 | A  | 6/1998  | Chou |
| 5,917,562 | A  | 6/1999  | Woodgate et al. |
| 5,956,001 | A  | 9/1999  | Sumida et al. |
| 6,084,647 | A  | 7/2000  | Hatano et al. |
| 6,122,103 | A  | 9/2000  | Perkins et al. |
| 6,174,394 | B1 | 1/2001  | Gvon et al. |
| 6,211,927 | B1 | 4/2001  | Yamazaki et al. |
| 6,437,915 | B2 | 8/2002  | Moseley et al. |
| 6,813,077 | B2 | 11/2004 | Borrelli et al. |
| 6,900,126 | B2 | 5/2005  | Carter et al. |
| 2004/0085496 | A1 | 5/2004 | Paukshto et al. |
| 2004/0212790 | A1 | 10/2004 | Leidig |

FOREIGN PATENT DOCUMENTS

| KR | 10-1997-0068686 | 10/1997 |
| KR | 10-1998-0032886 | 7/1998 |
| KR | 10-2002-0041382 | 6/2002 |
| KR | 10-2002-0071541 | 9/2002 |
| KR | 10-2004-0085787 | 10/2004 |

*Primary Examiner* — Lauren Nguyen
(74) *Attorney, Agent, or Firm* — IPLA P.A.; James E. Bame

(57) ABSTRACT

A stereoscopic TFT-LCD with a wire grid polarizer affixed to internal surfaces substrates, applies to a LCD device having a thin polarizing film and a thin phase retardation film to display a 2D image and a 3D image, a thin film polarizing film formed by accurately processing a thin aluminum film, a polarizing film of a nano imprint lithography method that uses polymer, and a polarizing film and a liquid crystal material that form a polarizing nano material thin film by uniformly coating a polarizing nano material (TCF), wherein a ¼ phase retardation plate is disposed at a front surface of the second transparent substrate so as to produce circularly-polarized light.

1 Claim, 16 Drawing Sheets

STEREOSCOPIC TFT-LCD WITH WIRE GRID POLARIZER AFFIXED TO INTERNAL SURFACES SUBSTRATES

CROSS REFERENCES

This application is a division of application Ser. No. 13/073,979 filed Mar. 28, 2011, now U.S. Pat. No. 8,184,216, which is a division of application Ser. No. 12/545,915 filed Aug. 24, 2009, now U.S. Pat. No. 7,940,342 which is a continuation of application Ser. No. 11/160,737 filed Jul. 6, 2005 which is now abandoned, and claims foreign priority under Paris Convention to Korean Patent Application No. 10-2005-0050994 filed 14 Jun. 2005, and Korean Patent Application No. 10-2004-0058837 filed 27 Jul. 2004, where the entire contents are incorporated herein by reference.

BACKGROUND

The present invention relates to a stereoscopic TFT-LCD (Thin Film Transistor—Liquid Crystal Display) with a wire grid polarizer affixed to internal surfaces substrates, which applies to a LCD device having a thin polarizing film and a thin phase retardation film, capable of displaying a 2D (dimension) image and a 3D (dimension) image.

Korean Patent Publication No. 10-2002-0041382 by Lee, entitled "Liquid crystal shutter for 3D display device" discloses a technique capable of removing Moire interference phenomenon fin a display device that is designed to implement a 3D based on a parallax barrier.

The U.S. Pat. No. 6,122,103 of US Moxtek Inc. discloses a thin polarizing film manufactured using a thin aluminum film.

The U.S. Pat. No. 6,813,077 of Corning Inc. discloses a technique of fabricating a thin film of a wire grid with an imprint method. In addition, the U.S. Pat. Nos. 5,772,905 and 6,900,126 discloses a nano imprint lithography that uses polymer. The U.S. Pat. No. 6,174,394 of Optiva Ltd. Discloses a polarizing nano material (TCF) fabricated by a technique related with a polarizing nano material thin film. Some companies including Germany Merck company sell liquid crystal material (Reactive Mesogen) related to fabrication of phase retardation film. The U.S. Pat. No. 5,917,562 (issue date: Jun. 29, 999) entitled "Autostereocopic display and spatial light modulator" that is one of the prior art of the present invention discloses an automatic 3D display apparatus capable of improving an image contrast between a left eye and a right eye.

FIG. 1 is a view illustrating a conventional 3D display structure, and FIG. 2 is a cross sectional view of FIG. 1. In the LCD device capable of displaying a 2D image and a 3D image, a first polarizing film 3 is installed at a front side of a backlight unit 2. A first transparent substrate 4 is disposed at a front surface of the first polarizing film 3, and a crystal liquid layer 10 filled with a liquid crystal material is disposed between a first transparent substrate 4 and a second transparent substrate 11.

The second polarizing film 12 having an orthogonal 90° polarizing direction with respect to the first polarizing film 3 is installed at a front surface of the crystal liquid layer 10. A first ½ phase retardation film 21 is installed at a front surface of the second polarizing film 3. When a user wears polarizing glasses 25 for left and right eyes having a 90° polarizing direction difference, the user can see a 3D image.

In the conventional LCD device capable of displaying a 3D image of FIG. 1, the first ½ phase retardation film 21 is installed at a front surface of a 2D image panel. When a user wears polarizing glasses 25 and sees a 3D image, a viewing angle is limited, and a viewing distance is limited. Since the 3D viewing angle is generally less than 16°, it is impossible to view 3D images clearly.

Therefore, a development of a 2D and 3D image display device capable of displaying 2D and 3D images and achieving a simple structure is urgently needed in the industry.

SUMMARY OF THE INVENTION

Accordingly, it is an object of the present invention to overcome the above-described problems encountered in the conventional art.

It is another object of the present invention to provide a LCD device having a thin polarizing film and a thin phase retardation film capable of displaying a 2D image and a 3D image with a simple structure in such a manner that polarizing films having different polarizing directions are disposed on the same plane, and a simple structure is achieved using a thin phase retardation film.

It is another object of the present invention to provide a LCD device having a thin phase retardation film that is achieved using a thin film polarizing film formed by accurately processing a thin aluminum film, a polarizing film of a nano imprint lithography method that uses polymer, and a polarizing film and a liquid crystal material that form a polarizing nano material thin film by uniformly coating a polarizing nano material (TCF).

To achieve the above objects, in a LCD (Liquid Crystal Display) device in which a first transparent substrate is disposed at a front surface of a backlight unit, and a first polarizing region having a polarizing direction angle of 0° or 45° and a second polarizing region having a polarizing direction angle of 90° or 135° are formed on a surface of the first transparent substrate in an orthogonal structure on the same plane, and a liquid crystal layer is disposed between a first alignment film and a second alignment film, and a second transparent electrode and a color filter are disposed at a front surface of the second alignment film, there is provided a LCD device having a thin polarizing film and a tin phase retardation film characterized in that a first polarizing region having a polarizing direction of 0° or 45° and a second polarizing region having a polarizing direction of 90° or 135° formed on a surface of the first transparent substrate are orthogonal from each other and are aligned on the same plane, and a first insulation layer is stacked on the front surfaces of the first polarizing region and the second polarizing region, and next to that, the first transparent electrode and a first alignment film are disposed at a front surface of the first insulation layer, and a liquid crystal later filled with liquid crystal is aligned between the first and second alignment films, and a second transparent electrode, a color filter and a second insulation layer are sequentially disposed at a front surface of the second alignment film, and a third polarizing region and a fourth polarizing region are formed on the same plane in a structure in which the first polarizing region and the second polarizing region are orthogonal in their polarizing directions at 90°, and next to that the second transparent substrate is disposed, and a non-reflection coating layer is disposed at the front most surface.

In the first embodiment of the present invention, a polarizing film according to the present invention is integrally formed in a first polarizing region and a second polarizing region on a surface of a first transparent substrate of a conventional LCD panel. A liquid crystal layer is disposed between a third polarizing region and a fourth polarizing region integrally formed at a back surface of the second transparent substrate.

Namely, the first polarizing region and the second polarizing region are alternately formed at a surface of the first transparent substrate, and the third polarizing region and the fourth polarizing region are alternately formed at a back surface of the second transparent substrate, and the polarizing region formed at a portion corresponding to the first transparent substrate and the second transparent substrate are arranged to have different polarizing directions.

Here, the first polarizing region has a polarizing direction of 0° or 45°, and the third polarizing region has a polarizing direction of 90° or 135°. The polarizing direction between the first polarizing region and the third polarizing region has an orthogonal angle of 90°. In addition, the polarizing direction between the second polarizing region and the fourth polarizing region has an orthogonal angle of 90°.

In the second embodiment of the present invention, a third polarizing film is formed of a straight line polarizing film on the whole front surfaces of the backlight unit. A second ½ phase retardation film and a transparent unit are aligned at a surface of the first transparent substrate with a certain width and distance. Next, a first insulation layer is disposed. A first transparent electrode and a first alignment film are sequentially aligned at a front surface of the same. In addition, a liquid crystal layer, a second alignment film, a second transparent electrode, a color filter and a second insulation layer are sequentially aligned. A transparent substrate integrally formed of a third polarizing region and a fourth polarizing region are aligned at a front surface of the same. A non-reflection coating layer is disposed at a front most surface.

In the third embodiment of the present invention, a ¼ phase retardation film is disposed for converting an incident light into a circular polarizing light in the structure of the second embodiment of the present invention.

In the fourth embodiment of the present invention, the whole construction is similar with the first embodiment of the present invention. The structure of the polarizing region is aligned in a lattice shape, and a ¼ phase retardation film is further provided.

In the fifth embodiment of the present invention, the whole construction is similar with the third embodiment of the present invention. Here, the structure of the phase retardation film and the structure of the polarizing region are aligned in a lattice shape.

In the sixth embodiment of the present invention, the polarizing region is formed of a conductive metal differently from the structure of the fourth embodiment of the present invention. In this embodiment, since the polarizing film function and the electrode function are concurrently provided, two transparent electrodes and two insulation layers are not needed before and after the liquid crystal layer differently from the fourth embodiment of the present invention. Therefore, the fabrication process of the LCD device can be decreased, and the fabrication cost is also decreased.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
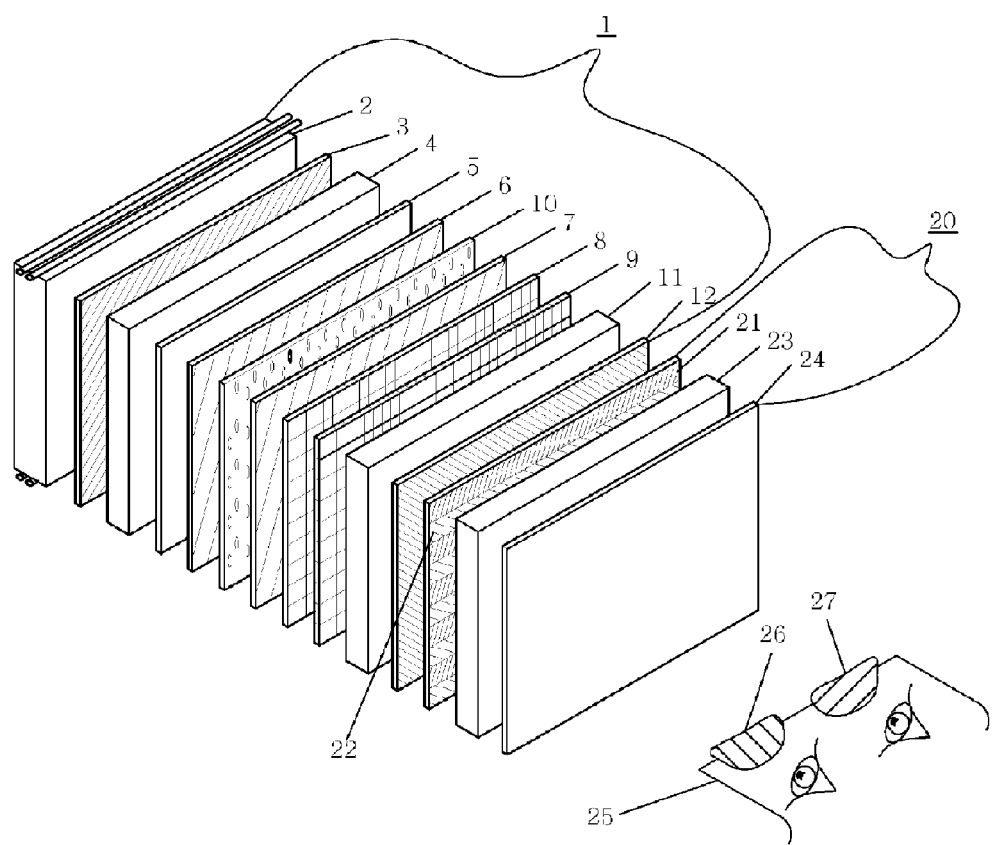
FIG. 1 is a view illustrating a construction of a conventional 3D display.
Figure 2:
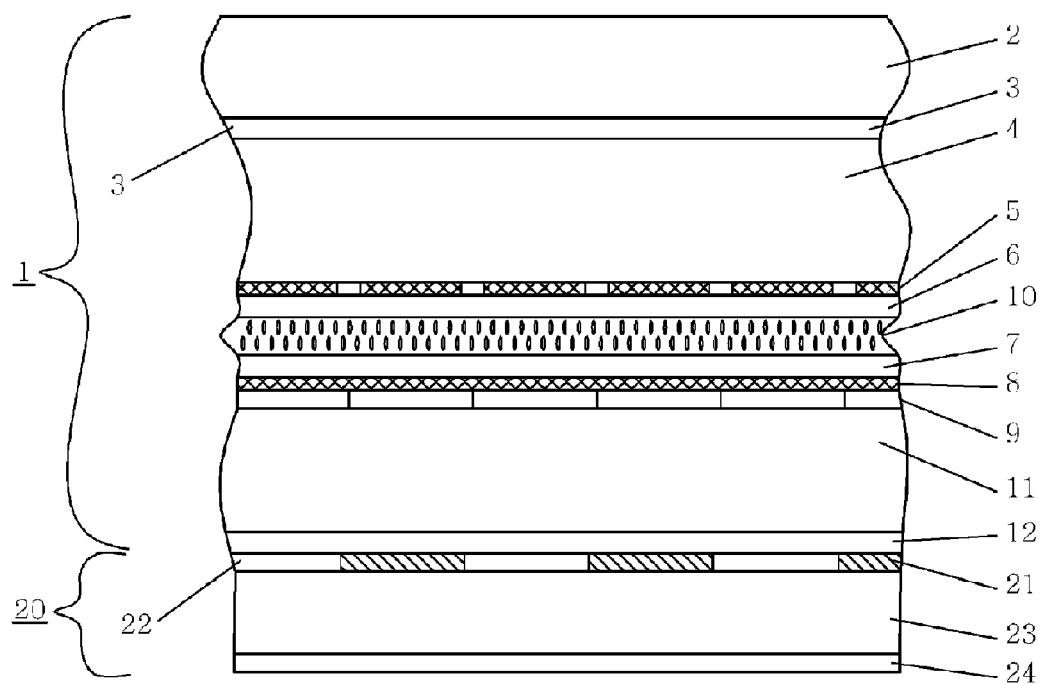
FIG. 2 is a cross sectional view of FIG. 1.
Figure 3:
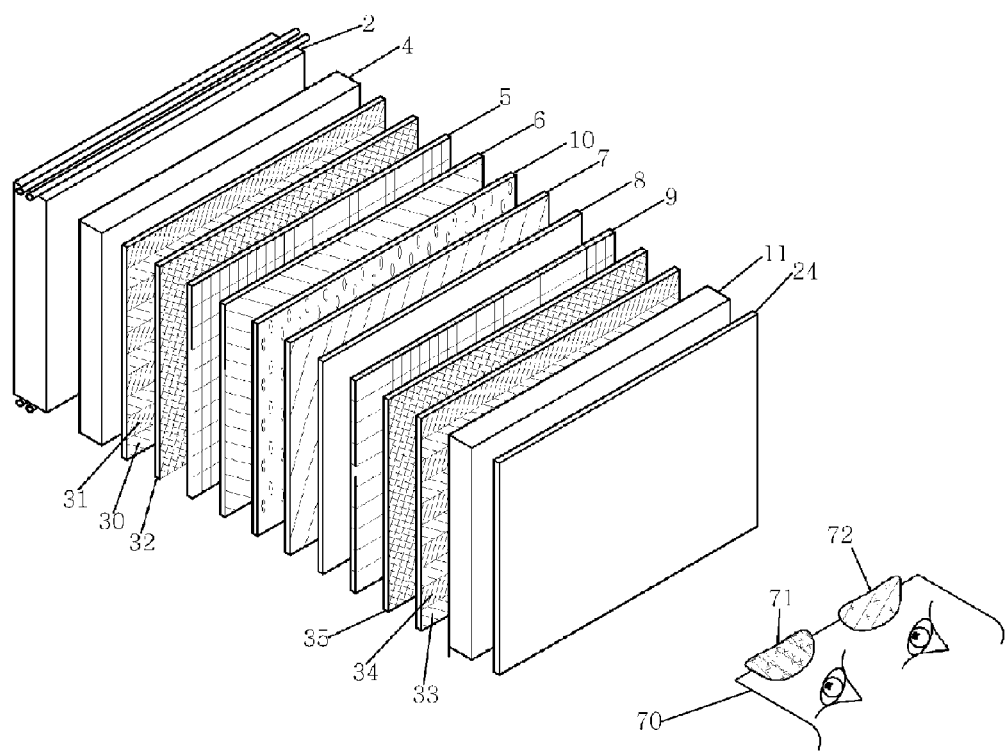
FIG. 3 is view illustrating a LCD device having a thin polarizing film and a thin phase retardation film according to a first embodiment of the present invention.
Figure 4:
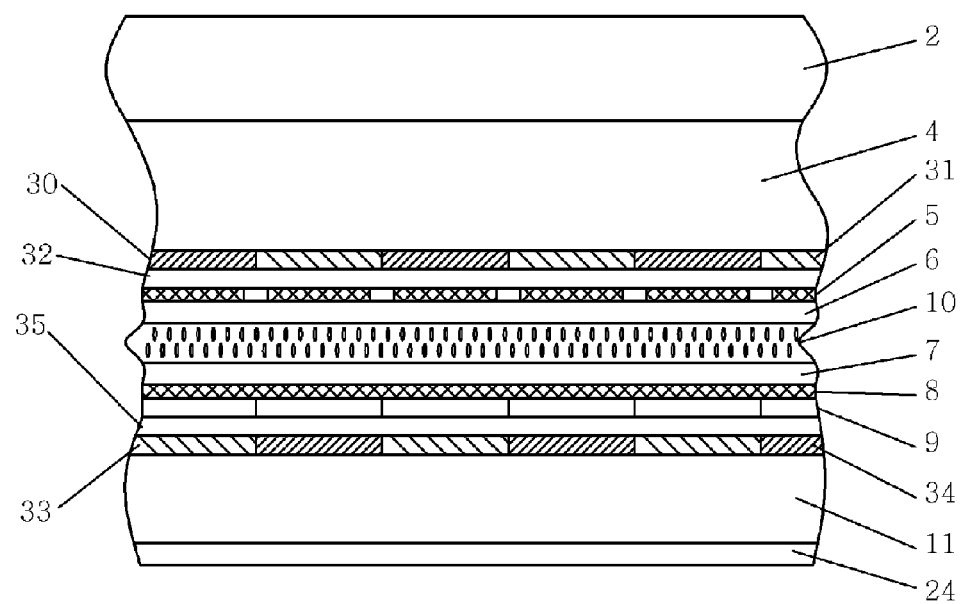
FIG. 4 is a cross sectional view of FIG. 3.
Figure 5:
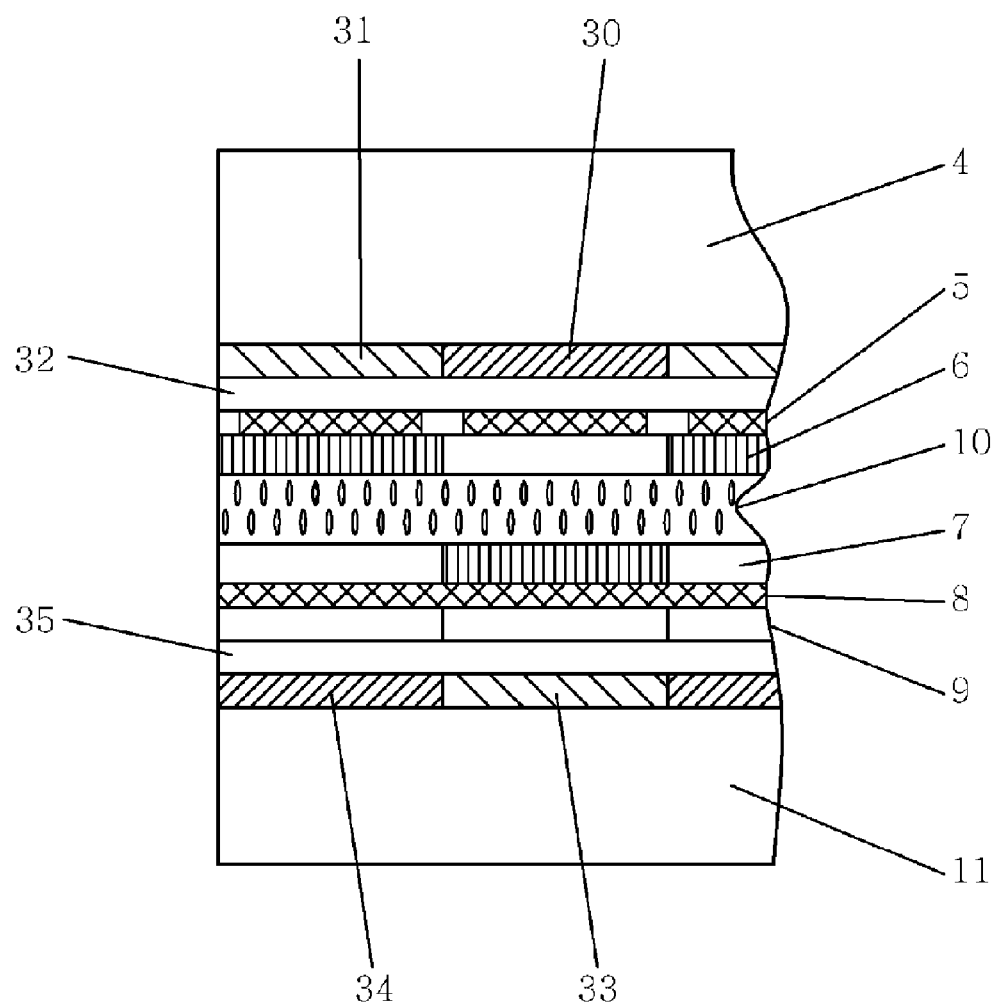
FIG. 5 is a detailed view illustrating a polarizing region and an alignment direction used in the present invention.
Figure 6:
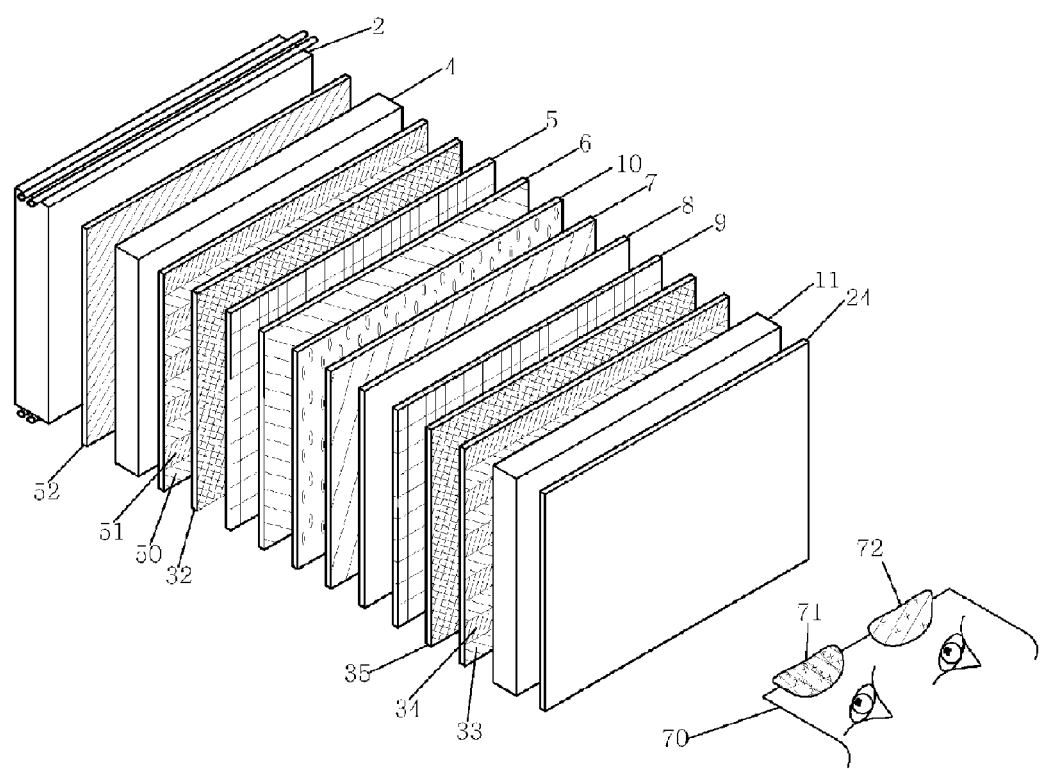
FIG. 6 is a view illustrating a LCD device having a thin polarizing film and a thin phase retardation film according to a second embodiment of the present invention.
Figure 7:
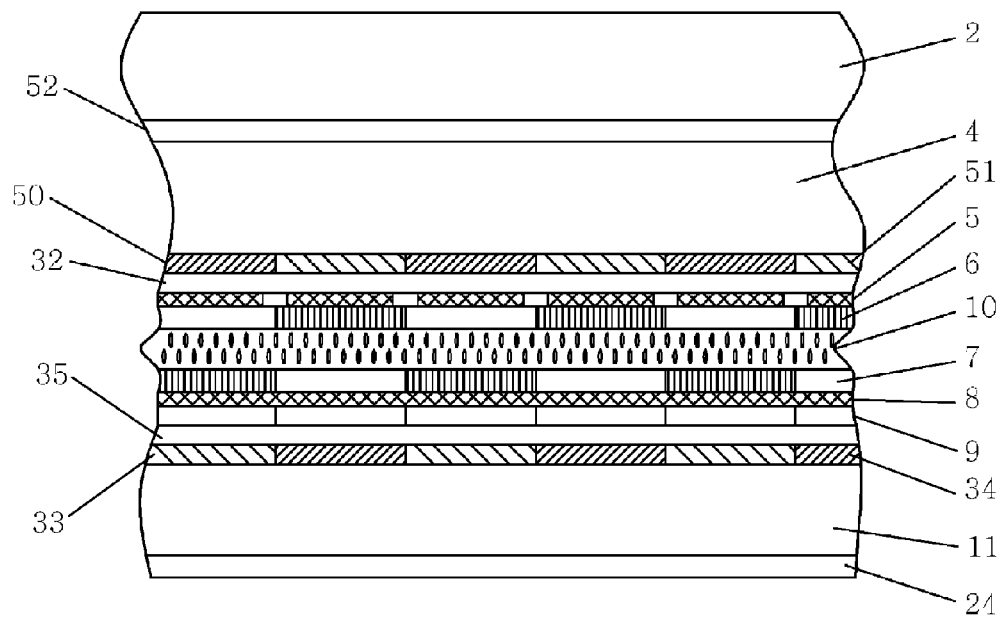
FIG. 7 is a cross sectional view of FIG. 6.
Figure 8:
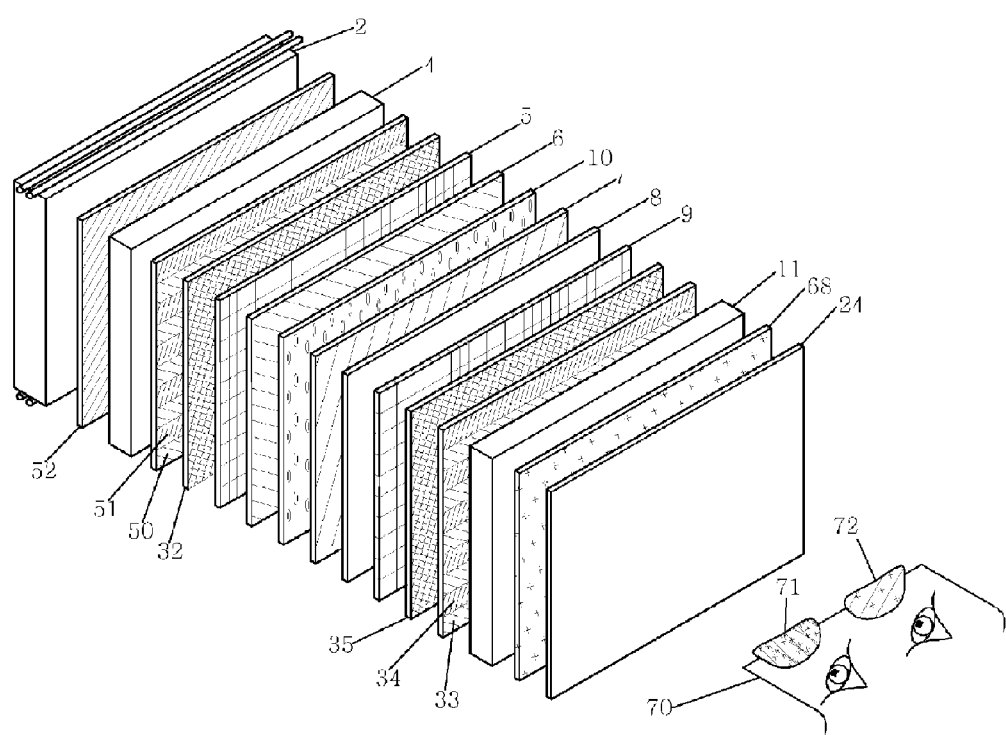
FIG. 8 is a view illustrating a LCD device having a thin polarizing film and a thin phase retardation film according to a third embodiment of the present invention.
Figure 9:
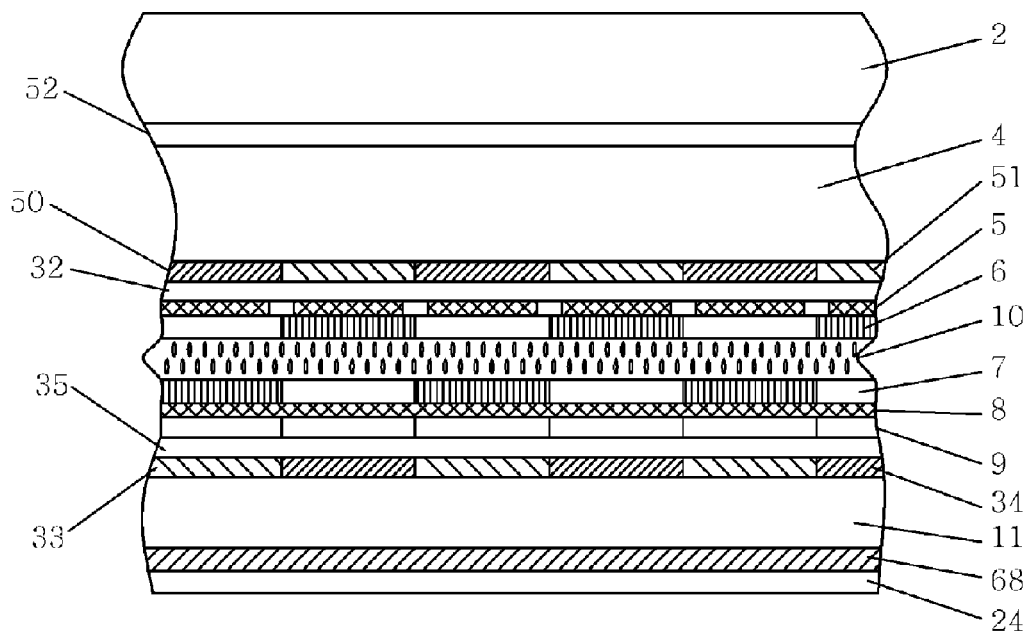
FIG. 9 is a cross sectional view of FIG. 8.

FIG. 3 is view illustrating a LCD device having a thin polarizing film and a thin phase retardation film according to a first embodiment of the present invention, FIG. 4 is a cross sectional view of FIG. 3, FIG. 5 is a detailed view illustrating a polarizing region and an alignment direction used in the present invention, FIG. 6 is a view illustrating a LCD device having a thin polarizing film and a thin phase retardation film according to a second embodiment of the present invention, FIG. 7 is a cross sectional view of FIG. 6, FIG. 8 is a view illustrating a LCD device having a thin polarizing film and a thin phase retardation film according to a third embodiment of the present invention, and FIG. 9 is a cross sectional view of FIG. 8.

Figure 10:
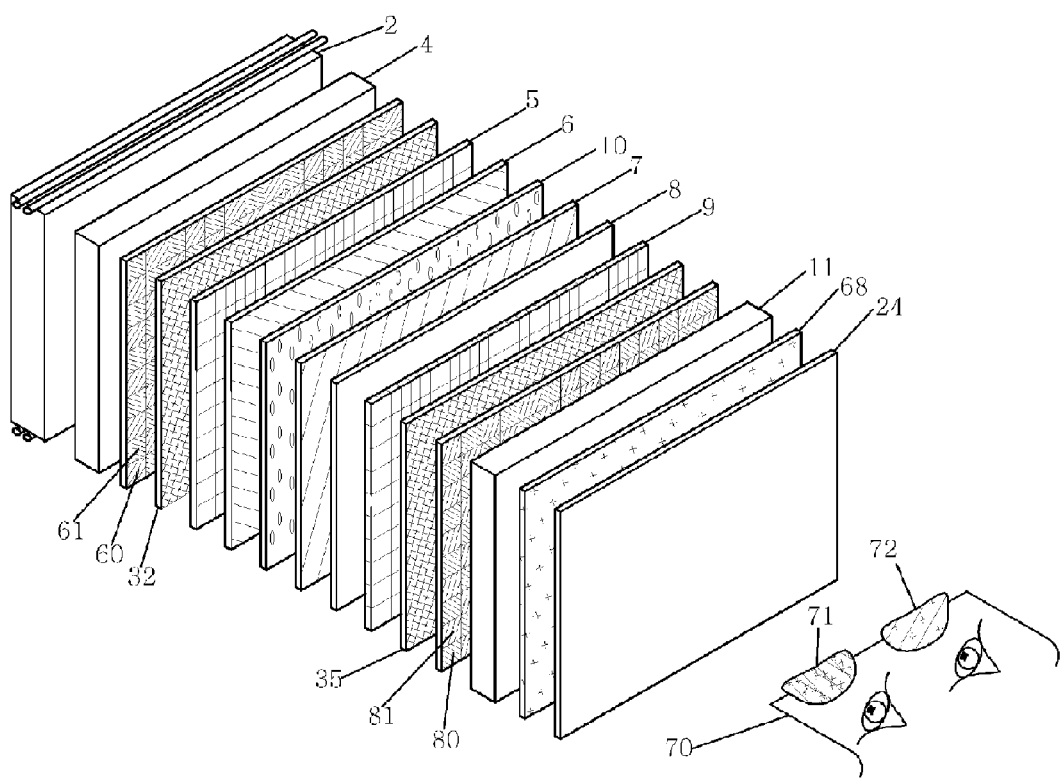
FIG. 10 is a view illustrating a LCD device having a thin polarizing film and a thin phase retardation film according to a fourth embodiment of the present invention.
Figure 11:
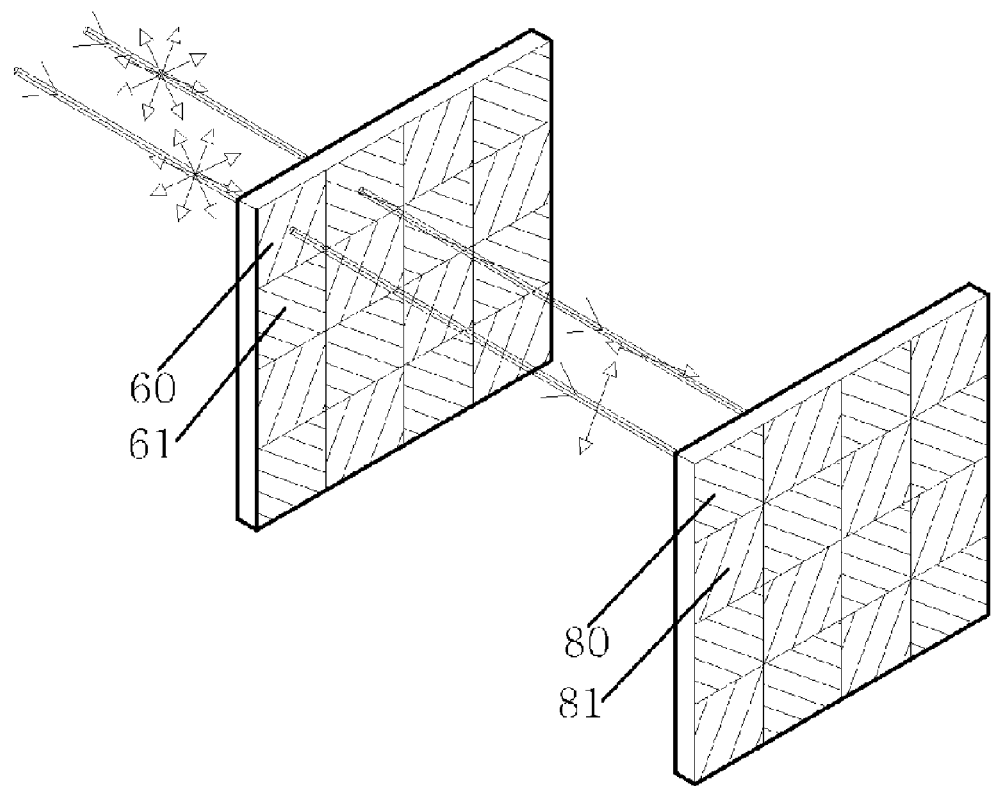
FIG. 11 is a view illustrating a structure of a polarizing film of FIG. 10.
Figure 12:
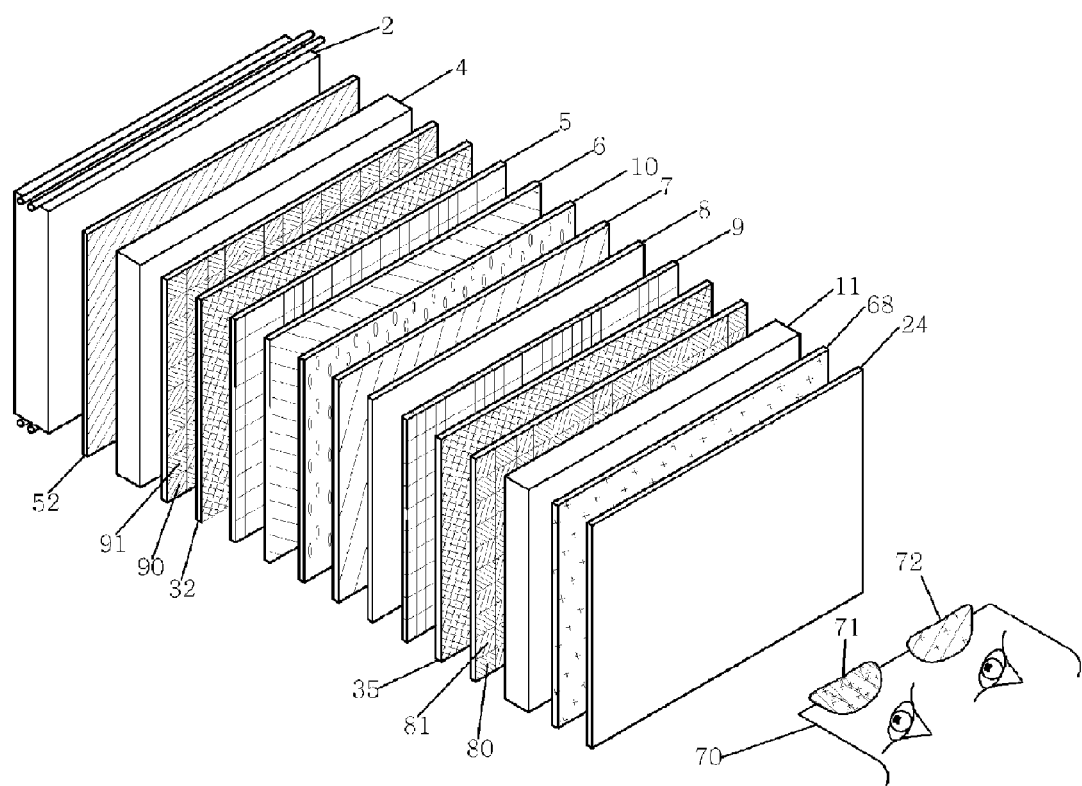
FIG. 12 is a view illustrating a LCD device having a thin polarizing film and a thin phase retardation film according to a fifth embodiment of the present invention.
Figure 13:
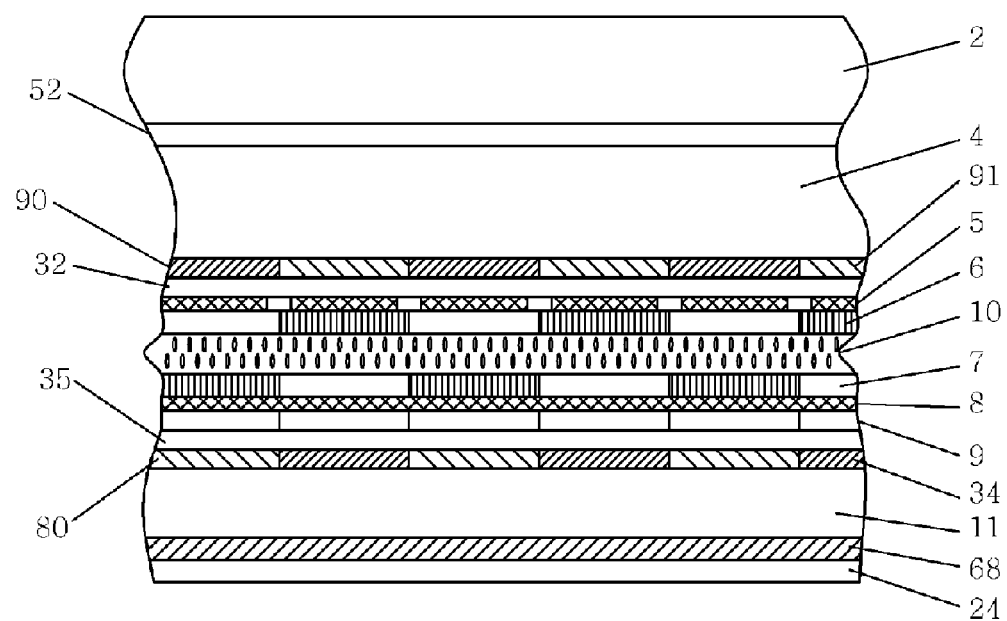
FIG. 13 is a cross sectional view of FIG. 12.
Figure 14:
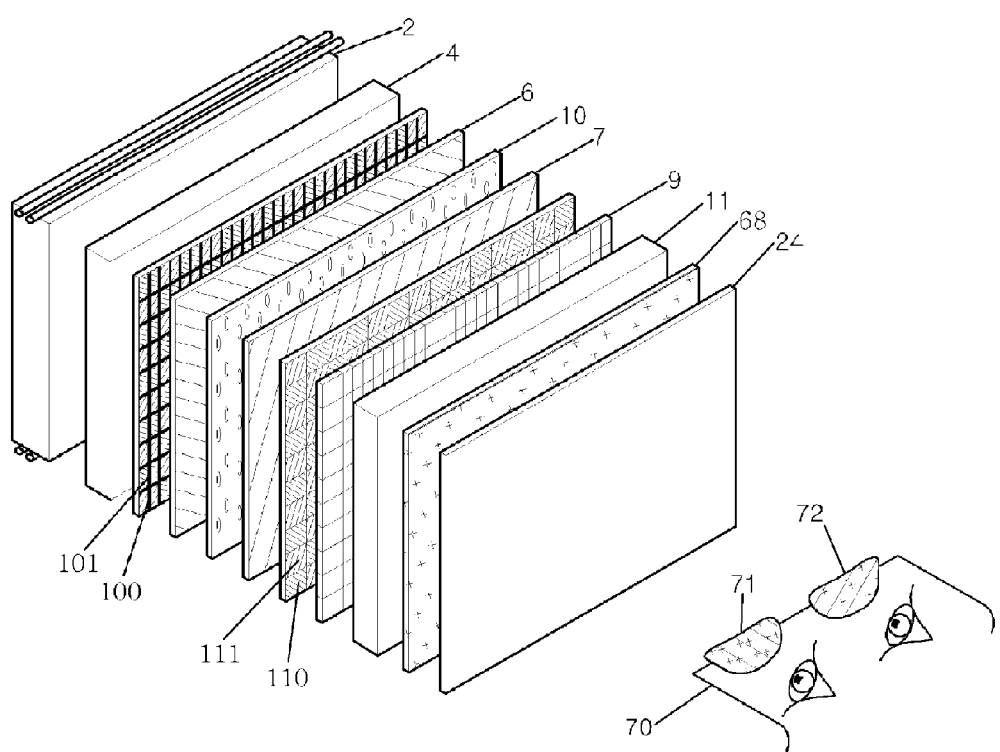
FIG. 14 is a view illustrating a LCD device having a thin polarizing film and a thin phase retardation film according to a sixth embodiment of the present invention.
Figure 15:
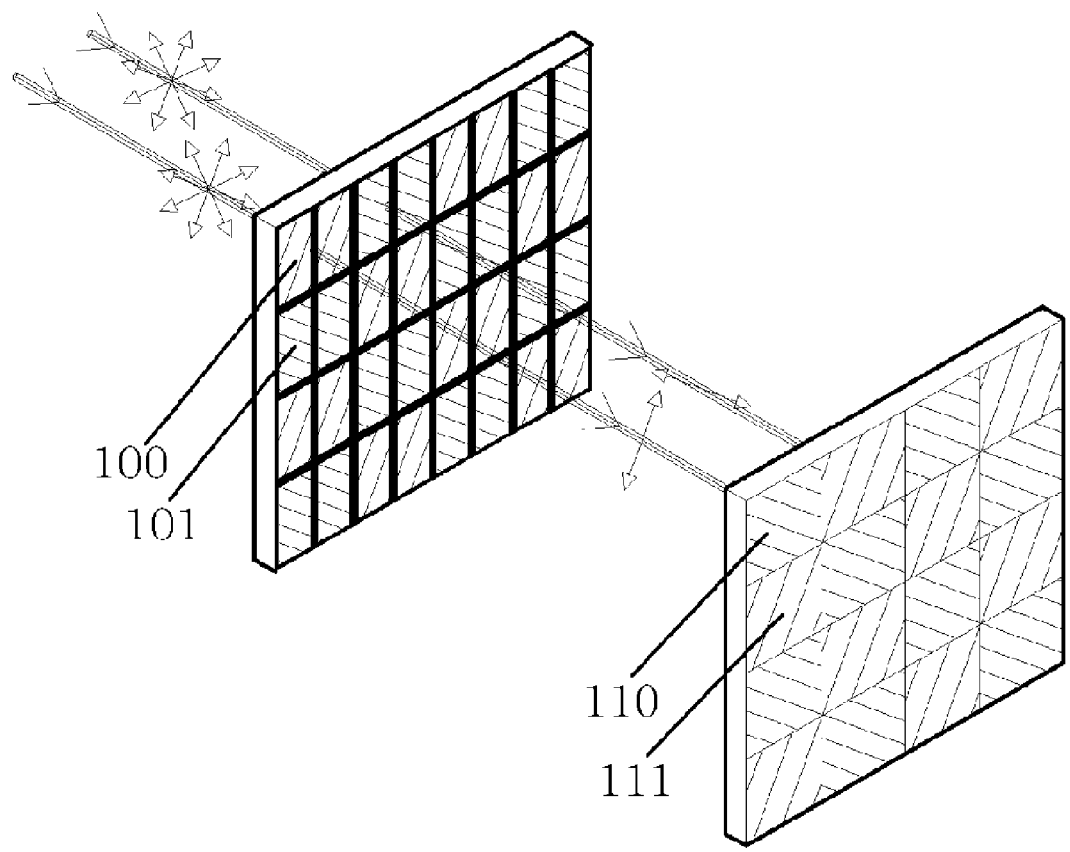
FIG. 15 is a view illustrating a structure of a conductive polarizing film of FIG. 14.
Figure 16:
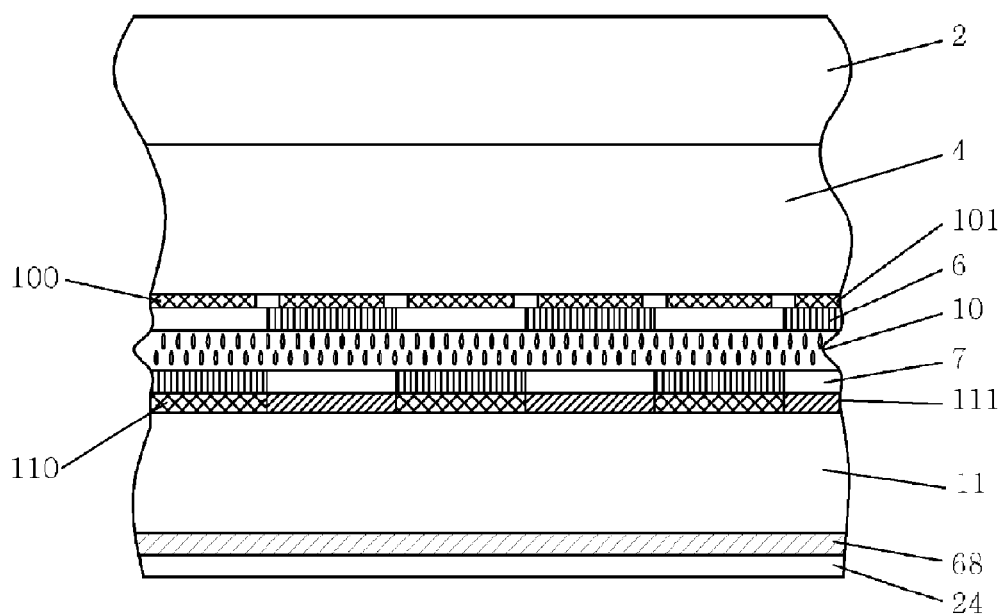
FIG. 16 is a cross sectional view of FIG. 14.

In addition, FIG. 10 is a view illustrating a LCD device having a thin polarizing film and a thin phase retardation film according to a fourth embodiment of the present invention, FIG. 11 is a view illustrating a structure of a polarizing film of FIG. 10, FIG. 12 is a view illustrating a LCD device having a thin polarizing film and a thin phase retardation film according to a fifth embodiment of the present invention, FIG. 13 is a cross sectional view of FIG. 12, FIG. 14 is a view illustrating a LCD device having a thin polarizing film and a thin phase retardation film according to a sixth embodiment of the present invention, FIG. 15 is a view illustrating a structure of a conductive polarizing film of FIG. 14, and FIG. 16 is a cross sectional view of FIG. 14.

First Embodiment

The 2D and 3D LCD device according to a first embodiment of the present invention will be described with reference to FIGS. 3 and 4. Polarizing regions are given reference numerals of 30, 31, 33, 34, 60, 61, 80 and 81 in order to recognize the regions from a polarizing film because the polarizing directions are orthogonal at 90° in a lattice shape on one plane.

As shown in FIGS. 3 and 4, in the liquid crystal device capable of displaying a 2D image and a 3D image according to the first embodiment of the present invention, a first polarizing region 30 having a polarizing direction of 0° or 45° formed on a plane of the first transparent substrate aligned on a front surface of the backlight unit 2 and a second polarizing region 31 that has a polarizing direction of 90° or 135° are aligned in an orthogonal structure. A first insulation layer 32 is aligned at a front surface of the first polarizing region 30 and the second polarizing region 31. A first transparent electrode 5 and a first alignment film 6 are disposed at the front surface of the same. A liquid crystal layer 10 filled with a liquid crystal is disposed between the first alignment film 6 and the second alignment film 7. Here, the alignment directions of the first alignment film 6 and the second alignment film 7 may be different based on the kinds of liquid crystal.

As shown in FIG. 5, it is preferred that the alignment directions of the first alignment film 6 and the second alignment film 7 are vertical at the portions corresponding to the first polarizing region 30 and the second polarizing region 31, but the alignments may be in the same direction depending of the kinds of the liquid crystal. When electromagnetic field is applied to the liquid crystal layer 10, it is moved based on the characteristic of the liquid crystal. Therefore, it is needed to retard transmitting light.

Next, a second transparent electrode 8 connected to a thin film transistor (TFT), a color filter 9 and a second insulation layer 35 are disposed at a front surface of the second alignment film 7. A third polarizing region 33 and a fourth polarizing region 34 are integrally formed at the next front surface in a structure that the polarizing direction is orthogonal at 900 with respect to the first polarizing region 30 and the second polarizing region 31. A non-reflection coating layer 24 is disposed at the front most side.

In the conventional liquid crystal display panel, the polarizing films before and after the liquid crystal layer have the same polarizing direction, and the polarizing directions have 90° difference. In this embodiment of the present invention, the polarizing films are formed like a structure that fine stripes are orthogonal from each other with the polarizing directions being 90° fine stripes are orthogonal on one plane. Namely, the first polarizing region 30 and the second polarizing region 31 are on the front surface of the first transparent substrate 4, and the third polarizing region 33 and the fourth polarizing region 34 are integrally formed at the back side of the second transparent substrate 11. The liquid crystal layer 10 is disposed therebetween.

As shown in FIG. 5, the first polarizing region 30 and the second polarizing region 31 are alternately formed on the front surface of the first transparent substrate 4. The third polarizing region 33 and the fourth polarizing region 34 are alternately formed on the backside of the second transparent substrate 11. The polarizing regions formed at the portions corresponding to the first transparent substrate 4 and the second transparent substrate 11 have different polarizing directions.

Here, the first polarizing region 30 has a polarizing direction of 0° or 45°, and the third polarizing region 33 has a polarizing direction of 90° or 135°. The polarizing direction is orthogonal at 90° between the first polarizing region 30 and the third polarizing region 33. The polarizing direction is orthogonal at 90° between the second polarizing region 31 and the fourth polarizing region 34.

The operation of the LCD device according to the first embodiment of the present invention will be described. First, when light transmits the first polarizing region 30 formed at the front surface of the first transparent substrate 40 through the backlight unit 2, the light becomes a straight line polarizing light polarized at 0° or 45°. Since the light becomes a straight line polarizing state having 90° rotated polarizing direction after the light transmitted the liquid crystal layer 10, so that a viewer can view the image transmitted the third polarizing region 33 having a polarizing direction of 90° or 135°.

When the light from the backlight unit 2 transmits the second polarizing region 31 formed at the front surface of the first transparent substrate 4, the light is changed to a straight line polarizing light polarized at an angle of 90° or 135° and is changed to a 90° rotated straight line polarizing light while transmitting the liquid crystal layer 10. Therefore, as the light transmits the fourth polarizing region 34 having a polarizing direction of 0° or 45°, the viewer can view the images.

Therefore, the first polarizing region 30 and the third polarizing region 33 are matched with the pitches of the pixels at the liquid crystal display panel, and the right eye image is displayed at the odd number row at the LCD panel, and the left eye image is displayed on the even number row, so that the right eye image transmits the fourth polarizing region 34, and the left eye image transmits polarizing glasses 25, so that the viewer can see a 3D image.

Second Embodiment

The 2D and 3D liquid crystal display device according to the second embodiment of the present invention will be described. FIG. 6 is a view of the second embodiment, and FIG. 7 is a cross sectional view of FIG. 6.

As shown in FIG. 6, a part of the LCD device capable of displaying 2D and 3D images according to the second embodiment of the present invention is changed as compared with the first embodiment of the present invention. The above changes will be described in detail.

As shown in FIG. 6, in the LCD device capable of displaying 2D and 3D images according to the second embodiment of the present invention, a third polarizing film 52 formed of straight line polarizing films on its entire surface is disposed at the front surface of the backlight unit 2. The second ½ phase retardation film 50 and the transparent unit 51 are disposed at the front surface of the first transparent substrate 4 with a certain width and distance. Next, the first insulation layer 32 is disposed, and the first transparent electrode 5 and the first alignment film 6 are formed at the front surface of the same. A liquid crystal layer 10 filled with liquid crystal is disposed between the first alignment 6 and the second alignment film 7. When an electromagnetic field is applied to the liquid crystal layer 10, it is moved based on the characteristic of the liquid crystal, so that it is possible to retard the transmitting light.

Next, the second transparent electrode 8, the color filter 9 and the second insulation layer 35 are sequentially disposed at the front surface of the second alignment film 7. The second transparent substrate 11 integrally formed of the third polarizing region 33 and the fourth polarizing region 34 is disposed at the next front surface. A non-reflection coating layer 24 is disposed at the front most surface.

In the conventional LCD panel, the polarizing films before and after the liquid crystal have the same polarizing directions with 90° differences in their polarizing directions. In the first embodiment of the present invention, new polarizing films are alternately orthogonal before and after the liquid crystal in fine stripe shapes having different polarizing directions of 90° at one plane. In the second embodiment of the present invention, the second ½ phase retardation film 50, the liquid crystal layer 10, the third polarizing region 33 and the fourth polarizing region 34 are sequentially engaged, and the polarizing films are integral with the above structure.

The operation according to the second embodiment of the present invention will be described. When light from the backlight unit 2 is changed to straight line polarizing light having a 90° polarizing direction while transmitting the third polarizing film 52 formed of straight line polarizing films. Next, the light transmitted the transparent unit 51 disposed at the front surface of the first transparent substrate 4 transmits the liquid crystal layer 10 and is changed to straight line polarizing light having a 90° rotated polarizing direction. The light transmits the fourth polarizing region 34 having a 0° or 45° polarizing direction, so that the viewer can view the image.

In addition, the light that transmitted the third polarizing film 52 and polarized at 90° or 135° transmits the second ½ phase retardation film 50 and has a 180° difference between incident light and the phase, so that the light is changed to straight line polarizing light having a 90° rotated polarizing direction, and the polarizing direction becomes 0°. The light becomes straight line polarizing light having a 90° rotated polarizing direction while transmitting the liquid crystal layer 10. Therefore, as the light transmits the third polarizing region 33 having a 90° or 135° polarizing direction, the viewer can view the image.

In the LCD panel, the transparent unit 51 and the fourth polarizing region 31 are matched with the pitches of the pixels, and the second ½ phase retardation film 50 and the third polarizing region 33 are matched with the pitches of the pixels. In the LCD panel, the right eye image is displayed at the odd number row, and the left eye image is displayed at the even number row. The right eye image transmits the fourth polarizing region 34, and the left eye image transmits the third polarizing region 33. Therefore, the viewer can view the 3D image using the polarizing glasses 25.

Third Embodiment

FIG. 8 is a view of the third embodiment of the present invention, and FIG. 9 is a cross sectional view of FIG. 8. As shown in FIG. 8, the construction of the third embodiment of the present invention is similar with the second embodiment of the present invention except for a ¼ phase retardation film 68 that is additionally provided in this embodiment. In more detail, the light from the backlight unit 2 is changed to straight line polarizing light having 90° or 135° polarizing direction while transmitting the third polarizing film 52 formed of straight line polarizing films.

The light transmitted the transparent unit 51 disposed at the front surface of the first transparent substrate 4 is changed to straight line polarizing light having a 90° rotated polarizing direction while transmitting the liquid crystal layer 10. Thereafter, the light transmits the fourth polarizing region 34 having a 0° or 45° polarizing direction. Next, the polarized light transmits the ¼ phase retardation film 68 and becomes a circular polarizing light. The viewer can view the image using the right eye polarizing glasses 72 of the circular polarizing glasses 70.

The light transmitted the third polarizing film 52 and polarized in straight line with 90° or 135° has a 180° angle difference between the incident light and the phase, so that the light is changed to the straight line light having a 90° rotated polarizing direction. The light is changed to have a straight line polarizing light state having a 90° rotated polarizing direction, while transmitting the liquid crystal layer 10. The light transmits the third polarizing region 33 having a 90° or 135° polarizing direction and then transmits the ¼ phase retardation film 68 and becomes a circular polarizing state. Therefore, the viewer can view the image using the left eye circular polarizing glasses 71 of the circular polarizing glasses 70.

The transparent unit 51 and the fourth polarizing region 34 are matched with the pitches of the pixels at the LCD panel, and the second ½ phase retardation film 50 and the third polarizing region 33 are matched with the pitches of the pixels. The right eye image is displayed on the odd number row at the LCD panel, and the left eye image is displayed on the even number row, so that the right eye image transmits the fourth polarizing region 34, and the left eye image transmits the third polarizing region 33. Therefore, the viewer can view the 3D images using the circular polarizing glasses 70. In the present invention, the viewer can view the 3D images using the circular polarizing glasses 70 even if the viewer's head is tilted in the left or right direction.

Fourth Embodiment

FIGS. 10 and 11 shows the fourth embodiment of the present invention. The basic construction is similar with the construction of the first embodiment of the present invention. The first, second, third and fourth polarizing regions are formed in a lattice structure like the fifth, sixth, seventh, and eighth polarizing regions. In this embodiment of the present invention, a ¼ phase retardation film 68 is further disposed. The same construction as the first embodiment will be omitted. Namely, only the fifth, sixth, seventh and eighth polarizing regions and the ¼ phase retardation film 68 will be described.

FIG. 11 is a view illustrating an optical characteristic of the polarizing region. The light outputted from the backlight transmits the fifth polarizing region 60 and is changed to a 45° rotated straight line light. When the light reaches at the seventh polarizing region 80, the light does not transmit the seventh polarizing region 80. In addition, the light transmitted the sixth polarizing region 61 is changed to a 135° rotated straight line light. When the light reaches at the eighth polarizing region 81, the light does not transmit the same.

When the above construction and principle are adapted in the construction of FIG. 10, the first transparent electrode 5 and the second transparent electrode 8 are disposed between the sixth polarizing region 61 and the eighth polarizing region 81. The liquid crystal layer 10 reacts with respect to electromagnetic field applied thereto for thereby retarding light, so that the viewer can view the 3D images. Here, the fifth polarizing region 60, the sixth polarizing region 61, the seventh polarizing region 80, and the eighth polarizing region 81 have polarizing direction angle difference of 90° at the corresponding portions. In addition, the ¼ phase retardation film 68 is additionally provided. In this case, the straight line polarizing light 25 of the first embodiment of the present invention is substituted with the circular polarizing glasses 70. Therefore, the viewer can view the 3D images even when the viewer's head is tilted in the left or right direction.

Fifth Embodiment

The fifth embodiment of the present invention is shown in FIG. 12. FIG. 13 is a cross sectional view of FIG. 12. The construction is basically similar with the third embodiment of the present invention. In this embodiment, the ½ phase retardation film and the transparent unit and the polarizing regions are formed in a lattice shape.

As shown in FIG. 12, the light from the backlight unit 2 transmits the third polarizing film 52 formed of straight line polarizing films and is changed to straight line polarizing light having 90° or 135° polarizing directions.

Next, the light transmitted the transparent unit 91 disposed at the front surface of the first transparent substrate 4 transmits the liquid crystal layer 10 and is changed to straight line polarizing light having 90° rotated polarizing direction. The light transmits the eighth polarizing region 81 having a polarizing direction of 0° or 45°. The polarized light transmits the ¼ phase retardation film 68 and is changed to a circular polarizing state. Therefore, the viewer can see the image through the right circular polarizing glasses 72 of the circular polarizing light glasses 70.

In addition, the light polarized at an angle of 90° or 135° and transmitted the third polarizing film 52 transmits the third ½ phase retardation film 90 and has 180° difference between the incident light and the phase. Therefore, the light is changed into straight line polarizing light having a 90° rotated polarizing direction. This light transmits the liquid crystal layer 10 and is changed to straight line polarizing light having a 90° rotated polarizing direction. Therefore, the light can be changed to circular polarizing light while transmitting the seventh polarizing region 80 having a 135° polarizing direction and the ¼ phase retardation film 68. Therefore, the viewer can view the images using the left eye circular polarizing glasses 71 of the circular polarizing light glasses 70.

Therefore, in the LCD panel, the transparent unit 91 and the eighth polarizing region 81 are matched with the pitches of the pixels, and the third ½ phase retardation film 90 and the seventh polarizing region 80 are matched with the pitches of the pixels. The right eye image is displayed at the portions of the transparent unit 91 and the eighth polarizing region 81 in the LCD panel, and the left eye image is displayed at the portions of the third ½ phase retardation film 90 and the seventh polarizing region 80. The right eye image transmits the eighth polarizing region 81, and the left eye image transmits the seventh polarizing region 80. Therefore, the viewer can view the 3D images using the circular polarizing light glasses 70. In addition, even when the viewer's head is tilted in the left or right direction, it is possible to view the 3D images using the circular polarizing light glasses 70.

Sixth Embodiment

The construction of the six embodiment of the present invention will be described with reference to FIG. 14.

In the sixth embodiment of the present invention, as shown in FIG. 14, the fifth polarizing region 60, the seventh polarizing region 80, and the eighth polarizing region 81 are all formed of a conductive metal. Here, the conductive metal represents an electrically conductive metal. Preferably, the conductive metal is aluminum. In the sixth embodiment of the present invention, since a conductive polarizing film is used, two transparent electrodes and two insulation layers are not needed before and after the liquid crystal layer.

The sixth embodiment of the present invention will be described in detail. FIG. 14 is a view illustrating a structure of the present invention, and FIG. 15 is a view illustrating an optical characteristic when the polarizing region is formed of a conductive metal, and FIG. 16 is a cross sectional view of FIG. 14.

The construction that the conductive metal, a major feature of the sixth embodiment of the present invention, is used for the polarizing region will be described.

As shown in FIG. 15, the polarizing regions are divided into a sub pixel shape of the display like the first conductive polarizing film 100 and the second conductive polarizing film 101. In addition, the third conductive polarizing film 110 and the fourth conductive polarizing film 111 are formed of common electrodes. Here, the polarizing directions of the third conductive polarizing film 10 and the fourth conductive polarizing film 111 are orthogonal at 90°, which correspond to the first conductive polarizing film 100 and the second conductive polarizing film 101.

When the above principle is adapted to the embodiment of FIG. 14, the first conductive polarizing film 100 and the second conductive polarizing film 101 formed on the plane of the first transparent substrate 4 disposed at a front surface of the backlight unit 2 are orthogonal with a 90° polarizing direction difference for thereby achieving a polarizing film function and a conventional transparent electrode function. Next to that, the first alignment film 6 is disposed, and the liquid crystal layer 10 filled with liquid crystal is disposed between the first alignment film 6 and the second alignment film 7. Here, the aligning directions of the first and second alignment films 6 and 7 may be changed depending on the kinds of the liquid crystal used. When an electromagnetic field is applied to the conductive polarizing film, the liquid crystal layer 10 is moved based on the characteristic of the liquid crystal for thereby retarding the transmitting light.

Next, the third conductive polarizing film 110 and the fourth conductive polarizing film 111 are disposed at the front surface of the second alignment film 7 with both polarizing film function and transparent electrode function. Next to that, the color filter 9 and the second transparent substrate 11 are disposed. Next, the ¼ phase retardation film 68 is disposed, and the non-reflection coating layer 24 is disposed at the front most surface.

In this embodiment of the present invention, when the thin polarizing film is formed using a conductive metal, since there are provided both polarizing film function and electrode function, two transparent electrodes and two insulation layers are not needed before and after the liquid crystal layer as compared to the conventional LCD device, so that the fabrication process of the LCD device is simplified, and the fabrication unit cost is decreased.

As described above, in the present invention, it is possible to implement an optical structure capable of viewing 2D and 3D images without providing additional parts for 2D and 3D images.

In the optical structure of the present invention, polarizing films are disposed very near the LCD device, so that a viewing angle is not limited in upper and lower directions wherein the limited viewing angle has been a big problem in the conventional art. In addition, a viewing distance is not limited in forward and backward directions. Multiple people can concurrently view 3D images irrespective of the viewing angle or distance.

In addition, the fabrication process of the LCD device can be decreased, and the fabrication cost of the 2D and 3D LCD device can be decreased.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A liquid crystal display (LCD) device having a thin polarizing film and a thin phase retardation film, wherein a backlight unit is disposed, a liquid crystal layer filled with liquid crystal is disposed between a first alignment film and a second alignment film, and a first transparent electrode connected to a thin film transistor (TFT) and a color filter are disposed at a front surface of the first alignment film, the LCD device characterized in that a third polarizing film formed of straight line polarizing films over its entire portions is disposed at a front surface of the backlight unit, wherein a second ½ phase retardation film and a transparent unit are integrally formed on a surface of the second transparent substrate in such a manner as to be alternately arranged with each other with a certain width and distance on the same plane, wherein a second insulation layer is disposed at the front surfaces of the second ½ phase retardation film and the transparent unit, wherein a second transparent electrode and a second alignment film are sequentially disposed at a front surface of the second insulation layer, wherein the liquid crystal layer, the first alignment film, the first transparent electrode, the color filter and a first insulation layer are sequentially disposed at a front surface of the second alignment film, wherein a first polarizing region and a second polarizing region are integrally formed on a surface of the first insulation layer in such a manner as to be alternately arranged with each other on the same plane, wherein a first transparent substrate is disposed at the front surfaces of the first polarizing region and the second polarizing region, wherein a non-reflection coating layer is disposed at the front-most surface of the liquid crystal display (LCD) device, wherein a ¼ phase retardation film is disposed at a front surface of the first transparent substrate for converting an incident light into a circularly polarized light, and wherein the non-reflection coating layer is disposed at a front surface of the ¼ phase retardation film so that a viewer can view a 3D image using circular-polarizing glasses.

\* \* \* \* \*